2 Sheets—Sheet 1.

J. M. POOLE,

Assignor to himself, W. T. Porter & T. S. Poole.

GRINDING-MACHINES.

No. 7,809. Reissued July 24, 1877.

*Attest:*

E. E. Masson

W. R. Edelen.

*Inventor:*

J. Morline Poole by Chas. H. Forbes

Attorney

2 Sheets—Sheet 2.

J. M. POOLE,

Assignor to himself, W. T. Porter & T. S. Poole.

GRINDING-MACHINES.

No. 7,809. Reissued July 24, 1877.

*Attest:*

E. E. Masson

W. R. Edelen.

*Inventor.*

J. Morton Poole

By Chas. H. Forbes

Attorney.

UNITED STATES PATENT OFFICE.

J. MORTON POOLE, OF WILMINGTON, DELAWARE, ASSIGNOR TO HIMSELF, WILLIAM T. PORTER, AND THOMAS S. POOLE.

IMPROVEMENT IN GRINDING-MACHINES.

Specification forming part of Letters Patent No. 130,741, dated August 20, 1872; Reissue No. 7,809, dated July 24, 1877; application filed June 22, 1877.

*To all whom it may concern:*

Be it known that I, J. MORTON POOLE, of Wilmington, county of New Castle, and State of Delaware, have invented certain new and useful Improvements in Grinding-Machines; and I do hereby declare that the following specification, taken in connection with the drawings furnished and forming a part of the same, is a full, clear, and exact description thereof.

This invention relates to that class of grinding-machines in which a traversing carriage supporting a grinding mechanism is arranged in contact with and directed by a stationary guide attached to the frame or bed of the machine.

The invention consists in the employment of a roller-guide, which may be constructed of chilled iron or hardened steel, in the form of a true cylinder, or with a symmetrical longitudinal curved outline, as described, respectively, in Letters Patent granted to me July 7, 1868, No. 79,683, and June 21, 1870, No. 104,492, and whereby I am enabled to produce a guide-roller having a perfectly true outline and a smooth and durable surface, and which is capable of a rotary adjustment, to present an infinite number of bearing-surfaces to the traversing carriage whenever a portion has been worn irregular by use.

To enable others to understand and use my invention, I have embodied it in a machine adapted for grinding rolls for various uses in the arts, such as calendering paper, rolling metal, &c.

A machine for calendering paper generally contains from six to eleven rolls, arranged in contact one above the other, the upper rolls being constructed of about equal diameter, and of a cylindrical form, while the lower roll is not only of a greater but of a gradually-increasing diameter from its ends to its middle portion, to compensate for its deflection under the weight of the superimposed rolls.

In machines for rolling sheet metal the rolls are required to be slightly smaller in diameter at their middle portion, so that when they expand from contact with the heated sheets of metal they will be straight upon their working faces.

Figure 1:
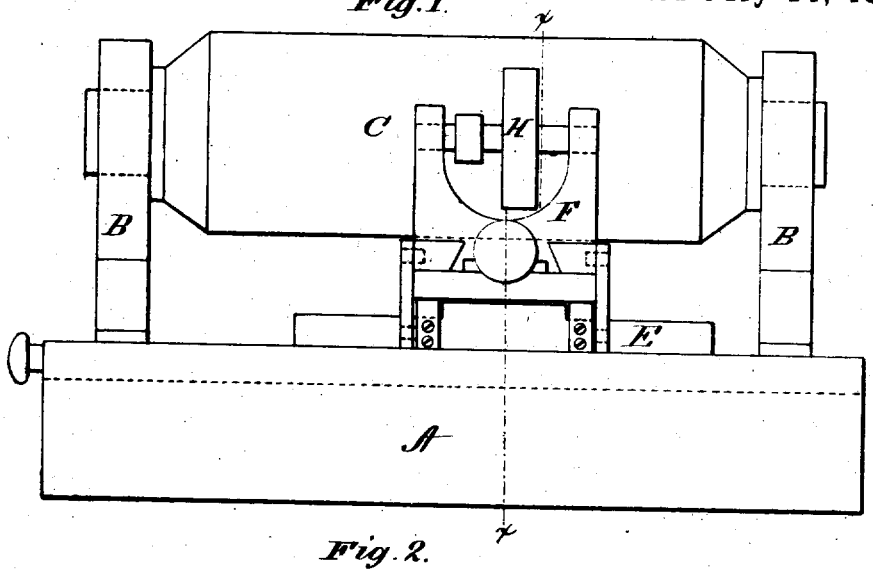
Figure 2:
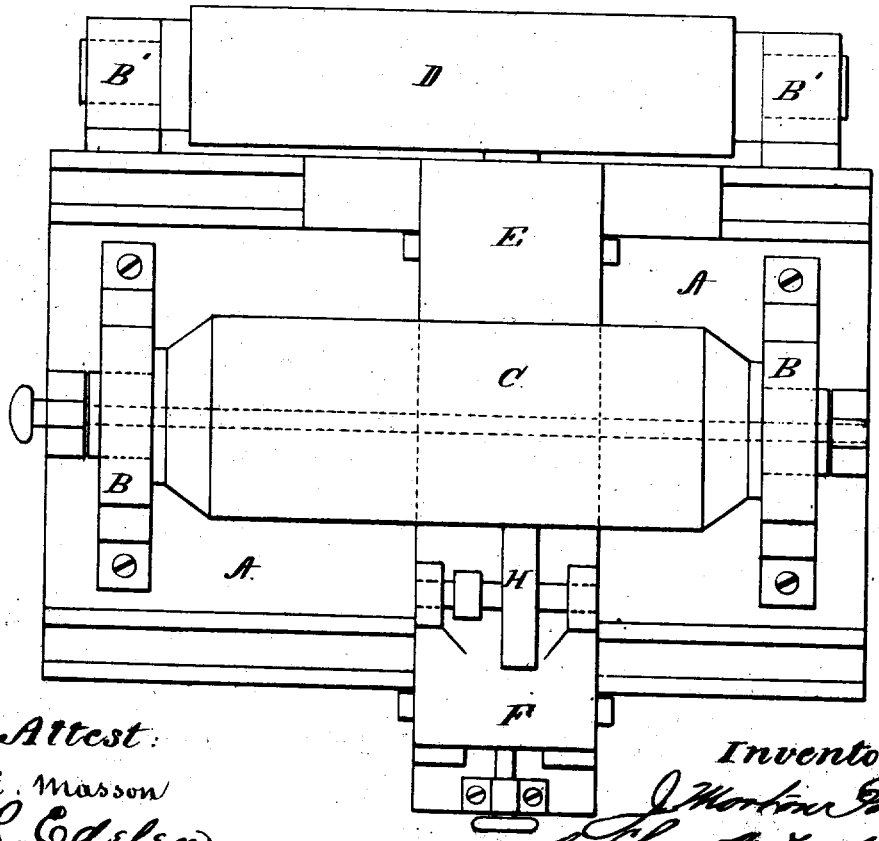
Figure 3:
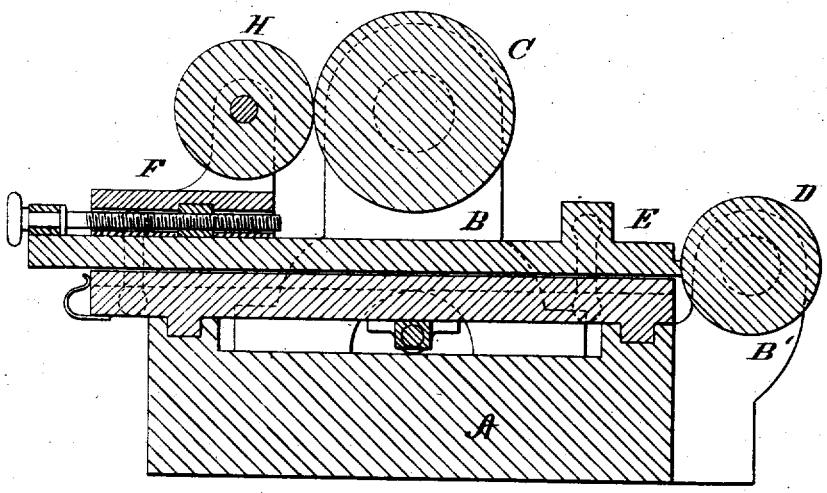

In the accompanying drawings, Figure 1 is a side elevation. Fig. 2 is a plan view; and Fig. 3, a transverse section on the line *x x* Fig. 1, in which—

A represents the bed of the machine, and B B′ the standards for supporting the roller C to be ground and the roller-guide D. E is a traversing carriage carrying the grinding devices F H, and arranged to move in contact with and follow the longitudinal form of the roller-guide D.

The mechanism for adjusting and regulating the operative parts of the machine described is composed of the usual and well-known devices employed for this purpose.

What I claim as my invention, and desire to secure by Letters Patent, is—

1. A roller-guide, substantially as described, in combination with a traversing carriage, for the purpose specified.

2. A roller-guide, substantially as described, capable of a rotary adjustment, in combination with a traversing carriage, for the purpose specified.

3. A roller-guide, substantially as described, in combination with a traversing carriage having a lateral movement, for the purpose specified.

J. MORTON POOLE.

Witnesses:
THOS. P. MORGAN,
J. MORTON POOLE, Jr.